Dec. 15, 1936.  H. M. ROCKWELL  2,064,688
MOTOR VEHICLE AND BRAKING SYSTEM THEREFOR
Original Filed Sept. 10, 1927  5 Sheets—Sheet 1

INVENTOR:-
Hugh M. Rockwell
BY George L. Ljungloff
ATTORNEY

Dec. 15, 1936. H. M. ROCKWELL 2,064,688
MOTOR VEHICLE AND BRAKING SYSTEM THEREFOR
Original Filed Sept. 10, 1927   5 Sheets-Sheet 3

INVENTOR:-
Hugh M. Rockwell
BY George L. Ljungloff
ATTORNEY.

Patented Dec. 15, 1936

2,064,688

UNITED STATES PATENT OFFICE 2,064,688

MOTOR VEHICLE AND BRAKING SYSTEM THEREFOR

Hugh M. Rockwell, Freeport, N. Y.

Refiled for application Serial No. 218,656, September 10, 1927. This application May 11, 1932, Serial No. 610,698

16 Claims. (Cl. 188—152)

This invention relates generally to motor vehicles and the like, and has particular reference to improved fluid pressure brakes and braking systems for vehicles.

Among the important objects of the invention, in its broader aspects, are: to provide a hydraulic braking system for vehicles wherein oil is used as the pressure medium and wherein the master cylinder is supplied with oil from the engine oiling system; to provide a novel master cylinder of simplified construction for hydraulic braking systems; to provide a hydraulic brake system which will be self-venting and entirely free from air pockets; to provide such a brake system wherein the pressure-fluid conduits will be well protected from injury; to provide hydraulic brakes of simplified form applicable to the steerable wheels of a vehicle and capable of transmitting equalized pressure to the several brake drums; to provide fluid-pressure brakes with simplified means for applying power to the brake bands; to provide fluid-pressure brakes which will be self-energizing and wherein novel floating connections are disposed between the brake cylinders and the brake bands.

Prior to this invention, a number of hydraulic brake systems for motor vehicles have been proposed and some of them have gone into commercial use, but they have all employed certain defects which have given rise to serious objections. In some instances, the proposed constructions have been too complicated, and therefore, too costly to produce for automobile use, while in others, mechanical defects and limitations have detracted from their utility. One of the principal defects found in most hydraulic braking systems lies in the formation of air pockets, due to the fact that the master cylinders and the wheel cylinders are at substantially the same level, and when air becomes trapped in the system, it results in lost motion. Such systems have made use of a special oil which is comparatively expensive and which, from time to time, requires replenishing in order to compensate for leakage in the system. Another objection has arisen from the arrangement of the fluid conduits, which in themselves have been expensive, because of requiring numerous frame fittings and the like, whereby to be properly supported, and in all such devices which have gone into commercial use, such conduits have been exposed throughout portions of their length, particularly adjacent the wheels, and have thus been subject to accidental injury. This is particularly true in connection with brakes applied to the front wheels of automobiles, since in such applications the conduits supplying the fluid to the wheel cylinders must necessarily be flexible and provided with considerable slack in order to permit the turning of the wheel for steering the machine.

The foregoing and other defects of the prior art are overcome by the present invention, which more specifically contemplates the provision of fluid-pressure brake systems for automobiles and the like, the new construction being extremely simple, efficient in use and economical in production. To achieve these results, the wheel cylinders are located at points below the axes of the wheels and the master cylinder is located at a substantial distance above said axes and the fluid conduits are gradually inclined downwardly from the master cylinder to the various wheel cylinders. The master cylinder is preferably of an improved and simplified form, having the pedal mounted directly upon the upper end of the plunger rod, which is operable for creating the braking pressure in the system, and said master cylinder has been shown in the drawings as being supplied with oil from the crankcase of the engine of the vehicle. The lubricating oil from the engine is, of course, under pressure, and for this reason it is possible to circulate the oil through the master cylinder. One of the principal features in this connection is that the oil is returned from the master cylinder to the crankcase at the highest point in the system. Naturally, any air leaking into the conduits or other part of the system will tend to rise, and, working up to the upper end of the cylinder, it will also pass along into the engine crankcase. The oil is conducted from the master cylinder in a longitudinal conduit, which extends forwardly or rearwardly, as the case may be, to the axle of the vehicle, and from there a pair of lateral branches extend to the wheel cylinders and are preferably carried by the axle. In the illustrated embodiment, said lateral branches extend inside of the axle, whereby to be entirely covered and protected, and this feature is particularly desirable where the cylinder is located below the axle, since in such a construction it is necessary that the axle be free from encumbrances which would interfere with jacking up the same in making tire repairs, etc. In the case of the front wheel brake, the wheel cylinder is mounted in the king pin, about which the steering knuckle turns, and due to this coaxial arrangement, the oil can easily be conducted to the cylinders. A novel floating connection is provided between the wheel cylinder piston and the corresponding brake band, the arrangement being such that the wear on the brake band will at all times be uniform throughout its entire periphery. Some of the principal features of this invention have been disclosed in my earlier application for Letters Patent on Stop light switches and brake systems for vehicles, Serial Number 195,107, filed May 28th, 1927, but these features have not been claimed in said earlier application.

The foregoing and other objects, features, and advantages of the invention will be more readily apparent from the following description in connection with the accompanying drawings, wherein the invention has been shown by way of illustration, and wherein.

Referring to the drawings in detail, the invention has been shown as applied to a motor vehicle which comprises a chassis frame 1 resiliently supported by front and rear springs 2 and 3, respectively connected to front and rear axles 4 and 5. The front axle 4 is equipped with the usual steerable road wheels 6 and the rear axle is equipped with the usual traction wheels 7, and power is supplied to said rear wheels 7 from a motor 8 through a propeller shaft 9 in connection with the internal mechanism of the rear axle 5. The front wheels 6 are rotatable on spindles 10, (Fig. 3), which extends outwardly from steering knuckles 11, said steering knuckles being movable about the axes of the king pin 12 in the yoke ends of the front axle 4, and the steering being accomplished by links 13 and 14 operable by a steering gear 15 in the usual well known manner. The motor vehicle illustrated in the drawings is equipped with a four-wheel brake system, in which the front and rear wheels are respectively provided with brakes 16 and 17, which are operated by a suitable fluid under pressure, supplied from a master cylinder 18. The fluid employed is preferably oil, and the master cylinder is mounted in a fixed position above the axles, while the brake cylinders are located below the axles and the arrangement is such that the entire system will be self-venting and substantially free from air pockets. The front and rear brakes 16 and 17 are essentially the same in details of construction and in principles of operation, there being slight differences due to the fact that the front wheels must necessarily be moved about the axles of the king pin, whereas the rear wheels have no such movement. However, it is thought that a detailed description of only one of these brakes will be sufficient for a complete understanding of the invention, and by reference to Figs. 3, 4, 6, 7 and 8, a complete description of one of the front wheel brakes 16 will be given.

Figures 4, 21, 22:
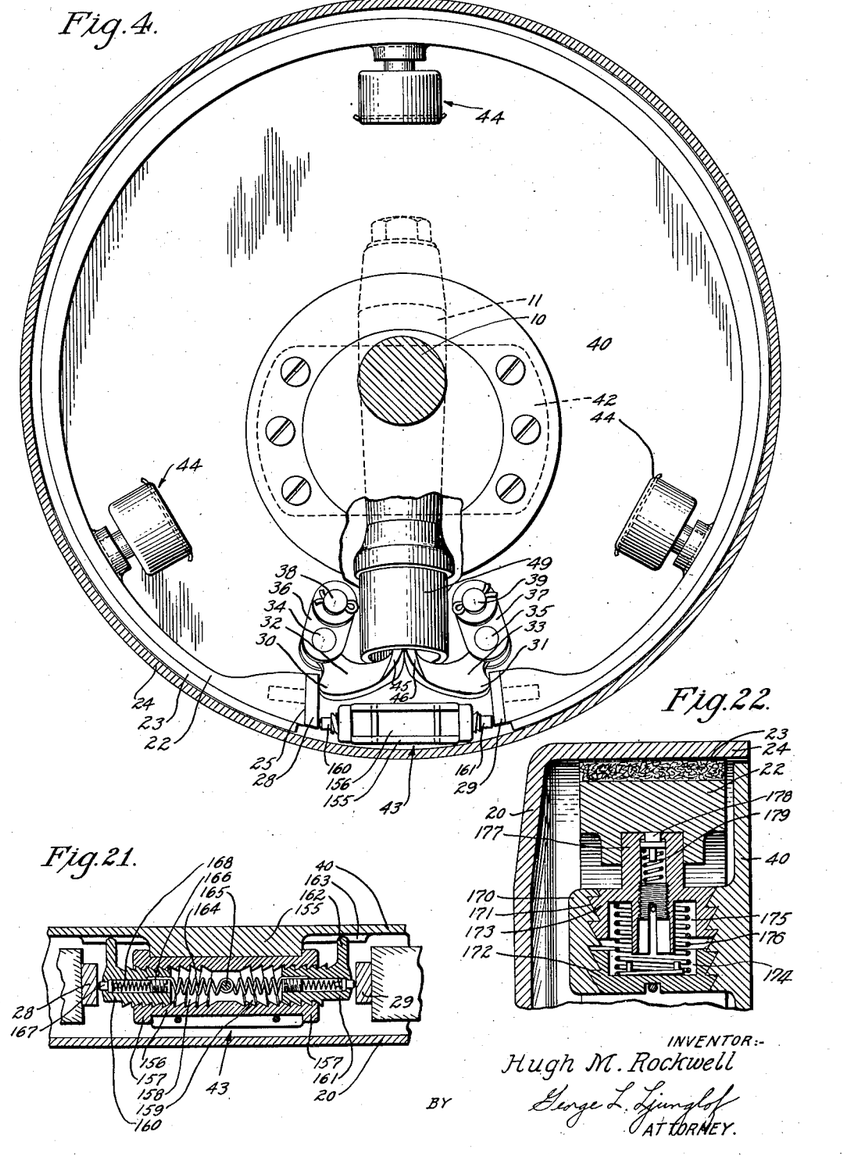
Fig. 4 is a substantially vertical, longitudinal, sectional view on line 4—4 of Fig. 3, and drawn on a larger scale.
Fig. 21 is a vertical, longitudinal, sectional view through an automatically adjustable abutment used in connection with a self-energizing brake band, as shown in Fig. 4.
Fig. 22 is a vertical, transverse, sectional view through an automatically adjustable support for said self-energizing brake band.

Each front wheel brake 16 includes a hollow brake drum 20 secured as by rivets or bolts 21 to the wheel 6, and within the drum 20 is an expansible brake band 22 having on its outer surface a suitable facing or lining of friction material 23 for engagement against the inner periphery of the cylindrical flange portion 24 of the brake drum 20. The brake band 22 is preferably in the form of a split band or ring of cast iron, spring steel, or other suitable material tending to retract by virtue of its inherent resiliency, and each of its ends is suitably reinforced by hardened steel blocks 25 secured in any desired manner. The proportions of the parts are such that the opposed reinforced ends 28 and 29 of the brake band 22 are spaced apart, as best shown in Fig. 4, and are respectively engaged by the heel portions 30 and 31 of actuating levers 32 and 33, which are pivoted at 34 and 35 to the free ends of links 36 and 37, said links in turn being pivotally supported on fixed pins 38 and 39 extending inwardly from a stationary mounting and dust plate 40. The plate 40 is circular in outline, to correspond with the brake drum 20 and has a central indented portion 41 secured to lateral flanges 42 of the steering knuckles 11, whereby to be held firmly in stationary position. The brake band is maintained in a floating, self-energizing condition by means of an abutment 43 which is secured to the inner surface of the plate 40 in such manner that one or the other of the ends 28 and 29 of band 22 will abut against the same, dependent upon the direction of rotation of the brake drum. With this arrangement, as the brake is applied the accumulated torque is made use of to assist the braking action. Necessarily, there will be slight relative rotary movement of the brake band in the two reverse directions of rotation of the brake drum, and the suspension of the levers 32 and 33 on the links 36 and 37 afford compensation for this slight shifting movement. The brake band 22 is supported in a substantially central position with reference to the brake drum by means of supporting members 44 which are carried by the plate 40 and spaced equi-distantly around the edge thereof. Said supporting members 44 and abutment 43 preferably include automatic adjusting means for taking up the slack in the brake band in order to compensate for wear in the band, and these automatic adjusting means will be more fully described hereinafter.

Figures 3, 5, 6:
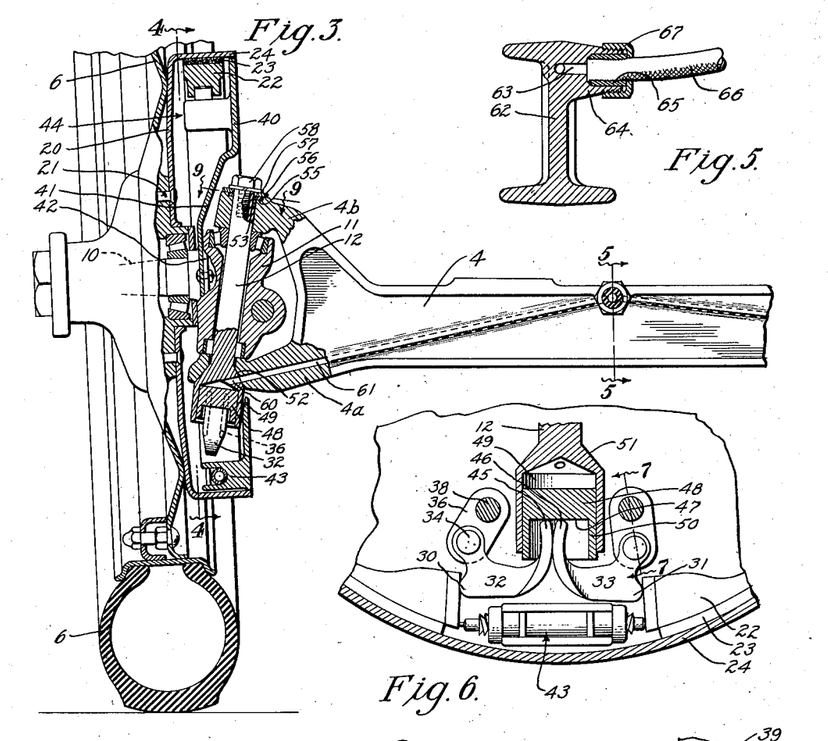
Fig. 3 is a fragmentary, vertical, transverse, sectional view through one of the front wheel mountings of the vehicle.
Fig. 5 is a vertical, transverse, sectional view on line 5—5 of Fig. 3, and showing one form of connecting the fluid conduits to a forged axle.
Fig. 6 is a vertical, longitudinal, sectional view through one of the wheel cylinders and part of the corresponding brake drum, and illustrating more clearly the connecting means between the cylinder and brake band when the brake is applied.
Figures 7, 8, 10:
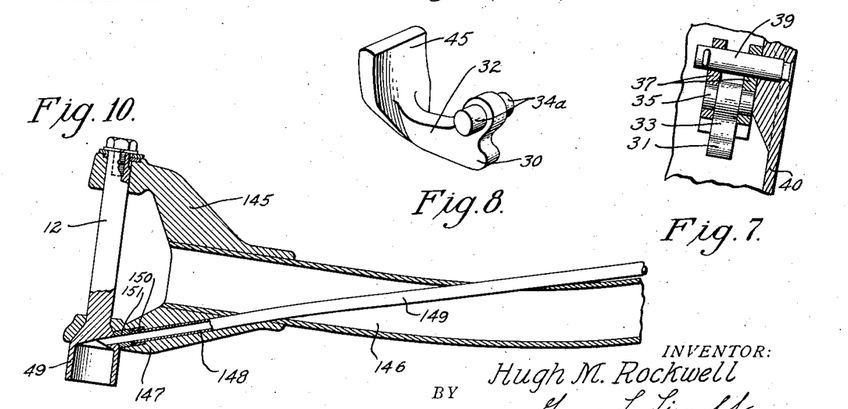
Fig. 7 is a fragmentary, sectional view on the line 7—7 of Fig. 6.
Fig. 8 is a detail, perspective view of one of the floating levers disposed between the wheel piston and one end of the brake band.
Fig. 10 is a fragmentary, sectional view through a tubular front axle and showing the means for conducting the fluid therethrough.
Figure 9:
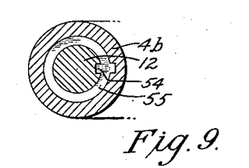
Fig. 9 is a substantially horizontal, detail, sectional view on line 9—9 of Fig. 3 and showing the key-washer for the king pin.
Figure 11:
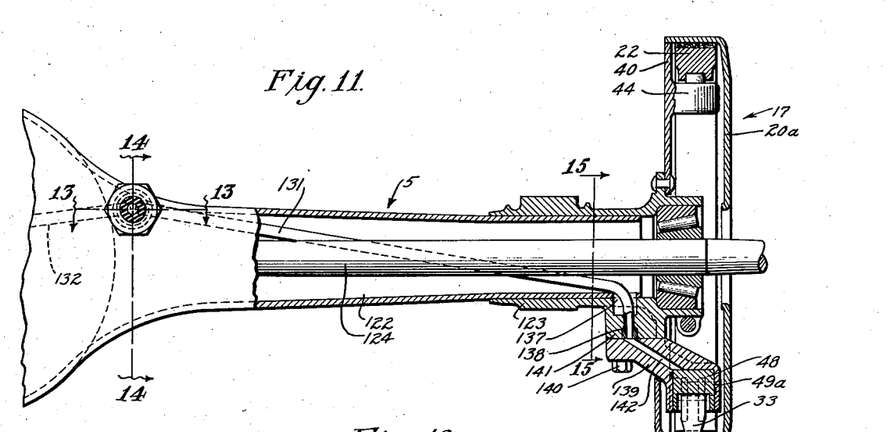
Fig. 11 is a fragmentary view, partly in elevation and partly in vertical section of the rear axle of the vehicle of Fig. 1.

The brake actuating levers 32 and 33 are substantially alike in structure but disposed in opposition to each other, as best shown in Figs. 4 and 6. Said levers respectively include toe portions 45 and 46, which are wider than the heel portions 30 and 31, and the outer surfaces of which are machined or otherwise formed in true arcs struck from the centers 34 and 35 respectively, or as cams if desired. Said arcuate toe portions 45 and 46 are constantly in rolling contact with each other, they being maintained in such condition by virtue of the inward pressure of the ends of the brake band against the heel portions of the levers. Because of this arrangement, said levers 32 and 33, together with their corresponding links 36 and 37 are maintained in a floating condition between the ends of the brake band and thus are capable of slight shifting movement with reference to the vertical center of the brake drum, the direction of such shifting being controlled by the direction of rotation of the brake drum. The toe portions 45 and 46 of these levers are situated at greater distances from the centers 34 and 35 than are the heel portions 30 and 31, the result being to provide a substantial leverage whereby the brake band can be expanded with less effort on the part of the operator. It will be noted that the heel portions 30 and 31 have a free sliding or a combined sliding and rolling contact with the ends of the brake band and that the toe portions 45 and 46 have a similar contact and/or engagement with the piston 48. As best shown in Fig. 7, the links 36 and 37 are preferably disposed in spaced parallel pairs with the corresponding levers arranged between them, and the lower ends of said links are apertured for the reception of pivotal pins 34a and 35a, carried by the levers. The outer or upper ends of the lever toe portions 45 and 46 terminate close together, as best shown in Fig. 6, and bear against the bottom surface 47 of a piston 48, which is mounted for reciprocation within a cylinder 49. The piston 48 preferably includes a skirt portion 50 which depends below the surface 47 in such manner as to provide a socket for the reception and retention of the lever toe portions, and said piston is preferably formed of steel or similar suitable material accurately machined with a smooth exterior to fit within the smooth bore of the cylinder 49. Said cylinder 49 has no closure at its lower end other than the piston, and this general construction is extremely simple as compared with prior art devices wherein the piston has been completely enclosed within the cylinder, fitted with a piston rod and various types of packing rings, etc. It will also be noticed from Figs. 3 and 4 that said cylinder 49 is disposed a substantial distance below the axis of the wheel spindle 10 and coaxial with the king pin 12, and this arrangement is important in that it provides a substantial difference in level between the wheel cylinder and the master cylinder, whereby to prevent the formation of air-pockets, and further, because it renders the connection of the oil conduits to the cylinder much simpler. In the preferred embodiment of the invention, the cylinder 49 is integral with the king pin 12 and forms in effect an enlarged head for the lower end thereof, said head being joined to the body of the king pin by a tapered shoulder portion 51 which is adapted to seat in a countersunk hole 52 in the lower axle yoke end 4a. At its upper end the king pin 12 is provided with a keyway 53 for locking engagement with a lug 54 of a keywasher 55, (Fig. 9) said keywasher 55 being disposed within a recess on the upper side of the axle yoke end 4b and firmly held against rotation with reference thereto. Overlying the keywasher 55 is a thrust washer 56 and lockwasher 57, by means of which a locking screw 58 is maintained in fixed position in the end of the king pin.

Figure 1:
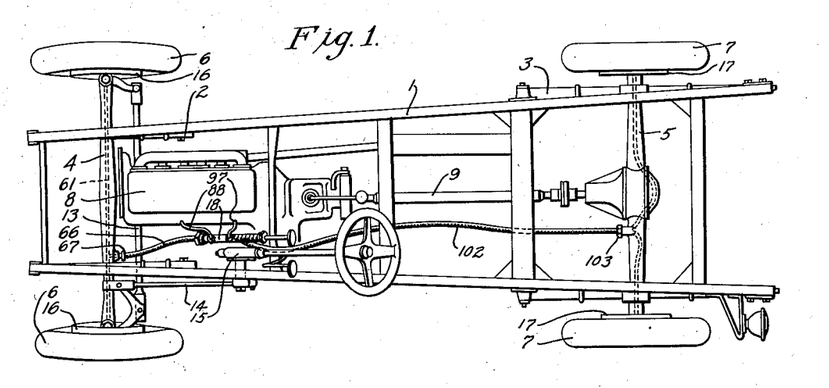
Figure 1 is a top plan view of an automobile chassis equipped with a braking system in accordance with this invention.
Figure 2:
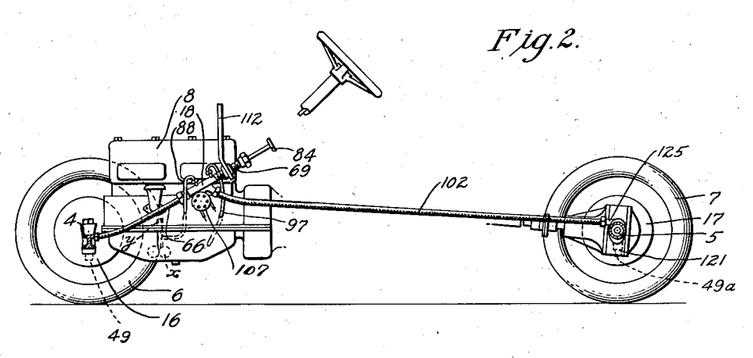
Fig. 2 is a vertical, longitudinal, sectional view through the same with parts broken away.

Extending inwardly from the tapered shoulder 51 of the head of the king pin is a hole 60 which forms communication with the bottom of the cylinder 49, as best shown in Fig. 3, and at its outer end said hole 60 is in communication with a bore 61 extending upwardly at a gradual inclination from the yoke end 4a to the body of the axle 4. Said bore 61 forms a laterally-extending oil conduit from a point in the axle intermediate the ends thereof and completely eliminates the flexible tubing which has been necessary in connection with prior art hydraulic or other fluid-pressure brakes. The elimination of such tubing considerably reduces the cost of manufacture of the complete system, since such tubing has been expensive and at the same time it provides an oil conduit which is entirely concealed, and therefore, protected from injury. In Figs. 3 and 5, the invention has been shown in conjunction with a forged axle of well known form, having an I-beam cross-section and wherein said inclined bore 61 extends through the web portion 62 of the axle. There are, of course, two bores 61 extending in opposite directions and converging at a point adjacent the upper side of the axle where they both intersect a rearwardly extending bore 63. The bore 63 is at the bottom of an enlarged boss 64 which is counterbored for the reception of a ring or ferrule 65 tightly fitted upon the extremity of a flexible tube 66, and said boss 64 is exteriorly screw-threaded, whereby to receive a tube-clamping nut 67 which firmly holds the extremity of the tube 66 in position on the axle. The tube 66 may be of any ordinary or preferred form, preferably having an inner flexible metallic lining covered by vulcanized fabric or the like, such tubing being specially designed to withstand the destructive effect of oil on rubber. The ring 65 is preferably formed of some malleable metal having its interior surface suitably roughened as by fine screw threads or the like, whereby it may firmly engage the exterior of the extremity of the tube 66 in such manner as to have a permanent mechanical union therewith. As best shown in Fig. 2, the tube 66 extends gradually upwardly and rearwardly, and has its other end connected to the lower end of the master cylinder 18, and said tube 66 is provided with sufficient slack to compensate for relative movement between the frame 1 and the axles of the vehicle.

From the foregoing it will be seen that when the braking system is filled with oil or some other fluid, increase of pressure originating in the master cylinder will be transmitted through the tube 66 and the conduits 61 and 60, respectively, to the cylinders 49, causing the pistons 48 to be moved outwardly, and moving with them the levers 32 and 33 in such a manner as to swing the same about their respective pivots 34 and 35. Such movement tends to increase the distance between the respective heel portions 30 and 31, and thus expands the brake bands 22. As pressure in a fluid is transmitted equally in all directions, it will be evident that the braking force on the several brakes is equalized, and as the pressure is relieved, the pistons 48 will return to their original positions, followed by the toe portions 45 and 46 of the actuating levers. The pressure is generated in the master cylinder through the instrumentality of a foot pedal or manual control, and while any one of a number of well known forms of master cylinders may be employed in conjunction with the improved brakes above-described, I prefer to use a master cylinder of simplified form similar to that disclosed in the drawings, and such improved master cylinder will be described presently.

As best shown in Figs. 16 to 20 inclusive, the master cylinder 18 comprises a tubular body 69 which may preferably be formed as a casting and is mounted in an inclined position adjacent to and preferably below the floor board 70 of the vehicle. At its lower end, the cylinder 18 is screw-threaded, as at 71, for the reception of a nut 72 which firmly clamps in place the rear end of the oil tube 66, said rear end of the tube having a ferrule 73 similar in all respects to the ferrule 65 already described in connection with Fig. 5. Intermediate its ends, the cylinder body 69 has a smooth bore preferably reamed as at 74 and this reamed portion constitutes a sealing chamber within which a plunger 75 is adapted to reciprocate to generate pressure in the fluid. To facilitate manufacture, the internal diameter of the body 69 is enlarged, both above and below the reamed portion 74, and suitably related to the stroke of the plunger 75, said upper enlarged portion 76 is provided with a plurality of spaced lugs 77 which constitute guide means for the lower end of the plunger 75 when it is in its normal retracted position. The plunger 75 is preferably in the form of a smooth cylindrical rod adapted to fit snugly in the reamed portion 74 of the cylinder body and preferably has its upper extremity slightly reduced in diameter to provide a plunger rod 78 which extends outwardly from the master cylinder and through a packing gland 79. Suitable packing 80 is confined within said gland 79 by means of a metallic gland washer 81 so as to effectively prevent leakage of oil from the master cylinder outwardly through the gland. By particular reference to Fig. 2, it will be noticed that the gland 79 is at the highest point of the entire braking system, and therefore, the oil level is lower than said gland. This arrangement is particularly important in that it reduces leakage of oil to a minimum. A foot pedal 82 is mounted upon the upper end of the plunger rod 78 by means of a stud 83, or other suitable means, and said pedal 82 has been shown as being equipped with the usual pedal pad 84 of any ordinary or preferred type.

Figures 16, 17, 18, 19, 20:
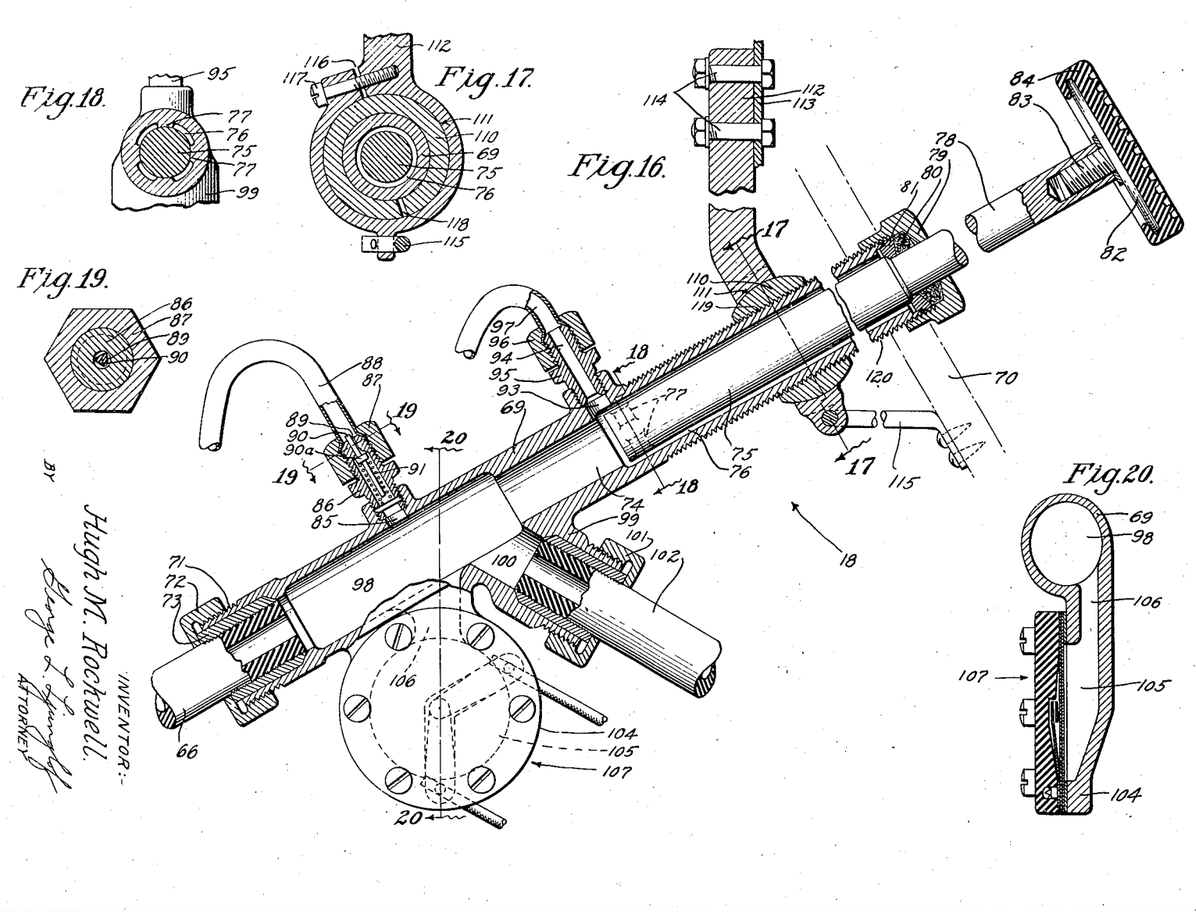
Fig. 16 is a vertical, longitudinal, sectional view through one form of the improved master cylinder and showing the plunger in its normal position of rest.
Fig. 17 is a transverse, sectional view on line 17—17 of Fig. 16.
Fig. 18 is a transverse, sectional view on line 18—18 of Fig. 16.
Fig. 19 is a transverse, sectional view on line 19—19 of Fig. 16, and drawn on a larger scale.
Fig. 20 is a vertical transverse sectional view on line 20—20 of Fig. 16 and showing one method of connecting a signal light switch to the master cylinder.

At any suitable point below the reamed portion 74 of the cylinder is an intake port 85 which is in communication with a nipple 86, threaded or otherwise secured to the body portion 69 and which provides at its outer end a screw-threaded connection for a coupling 87 associated with an oil supply pipe 88. The lower end of said oil supply pipe 88 is similarly connected to the crankcase of the engine 8 in such manner as to be supplied with oil from the usual pressure oiling system of the engine. This may be effected in any desired manner as by connecting the pipe 88 to the discharge pipe $y$ of the usual lubricating pump $x$. In the illustrated embodiment, the outer end of the nipple 86 is provided with a reduced orifice 89 within which is slidable a pin 90 carried by a valve 90a, which is influenced by a compression spring 91. Said pin 90 may have a substantially triangular cross-section, as best shown in Fig. 19, whereby to allow passage of a small volume of the fluid through the aperture 89 and past the valve, and the arrangement is such that as the main plunger 75 is operated, the pin 90 will be caused to reciprocate slightly within and beyond the end of the aperture 89 and prevent clogging of the aperture 89. Adjacent the upper end of the reamed portion 74, the cylinder body 69 is provided with an oil return port 93 which is in communication with the longitudinal bore 94 of a plain nipple 95 and the outer end of said nipple 95 is screw-threaded for connection with a coupling 96 similar to the coupling 87 and forming a detachable connection for an oil return pipe 97, the lower end of which is also connected to the engine crankcase to return the oil thereto. When the plunger 75 is in its normal position of rest at the upper end of the stroke, it has passed entirely out of the reamed portion 74 of the cylinder and has partly uncovered the port 93, leaving the same in communication with said reamed portion 74 and the lower chamber 98. In this condition oil is free to circulate through the master cylinder, it coming in through the tube 88 and returning to the engine lubricating system through the tube 97. Furthermore, any air in the braking system quickly works its way upward to the upper end of the system and passes out through the tube 97 for dissipation in the crankcase. In view of the fact that the orifice 89 in the nipple 86 is so restricted, the normal pressure of the fluid in the master cylinder will be very slight; in fact, sufficient only to insure a return of the surplus through the tube 97, and since the upper end of the plunger 75 comes to rest at a point above the return port 93, it will be evident that any oil which might adhere to the side of the plunger in its upward stroke will be free to float downwardly in the clearance provided between the side of the plunger 75 and the enlarged counterbored portion 76 of the cylinder body.

Intermediate its ends, and preferably at the lower side thereof, the cylinder body 69 is provided with an angularly disposed threaded boss 99, which is centrally bored as at 100 to communicate with the oil chamber 98 and adapted to form a connection for a nut 101 carried by the forward end of a flexible tube 102. Said tube 102 is similar to the tube 66 and extends rearwardly and downwardly to the rear axle 5, to which it is connected by means of a coupling 103, as will hereinafter be explained.

Extending downwardly from the master cylinder body 69, and preferably integral therewith, is a substantially circular body member 104 having a fluid recess 105 in communication with the chamber 98 by means of a downward passage 106, and associated with said circular portion 104 is a fluid-actuated switch by means of which a signal lamp may be controlled automatically as braking pressure is generated in and transmitted through the braking system. Such a switch may preferably be of the type and construction disclosed in my above-identified, earlier application bearing Serial Number 195,107. In that application, the switch has been shown as disposed at the extreme lower end of the master cylinder, but, of course, it may be mounted in any other part of the system, as explained in said application, or, if desired, such a fluid-actuated switch may be entirely eliminated or replaced by some other type of switch. Since the arrangement of the switch is not a feature of the present invention, it is thought that a detailed description thereof is unnecessary in the present specification.

In order to mount the master cylinder 18 upon the chassis frame 1, any suitable form of bracket may be employed, but I have chosen for illustration a mounting which enables said master cylinder to be adjusted either longitudinally or angularly, or both, as desired. Such an adjustable mounting has been shown in connection with Figs. 16 and 17, and comprises a ball member 110 which is adapted to be clamped in a spherical seat 111 of a bracket 112. The bracket 112 may be secured to the dash 113 or other part of the chassis by means of bolts and nuts, as at 114, and, if desired, the lower end of the bracket may be held against vibration by means of a brace rod 115 secured to the lower side of the toe board 70 of the vehicle. The lower end of the bracket, which constitutes a socket for the ball 110, may be split, as at 116, and provided with a clamping screw 117 by means of which the walls of the socket 111 may be caused to tightly grip the ball 110, whereby to hold the same in the adjusted angular position. Similarly the ball 110 is formed with a kerf or slot 118 which renders said ball sufficiently yieldable to tightly grip the cylinder. A screw-threaded bore 119 extends entirely through the ball member 110 and is adapted to receive the cylinder body 69, the upper end of which is exteriorly screw-threaded, as at 120. In order to adjust the device to the desired position, it is merely necessary to unloosen the screw 117, whereupon the cylinder may be moved longitudinally by virtue of the threaded connections 119 and 120, or it may be moved angularly about the center of the ball member 110. After these adjustments have been made, the clamping screw 117 may be again tightened to hold the parts firmly in their adjusted positions. Such a mounting bracket is particularly desirable in that it makes possible the mounting of the master cylinder upon different types and sizes of vehicles, wherein the relative proportions necessarily vary, and thus a single master cylinder and mounting bracket may be a standardized unit for all commercial vehicles. Such a standardized mounting is not necessary, however, to the successful practise of the invention, and in some installations the master cylinder might be otherwise mounted.

Figures 12, 13, 14:
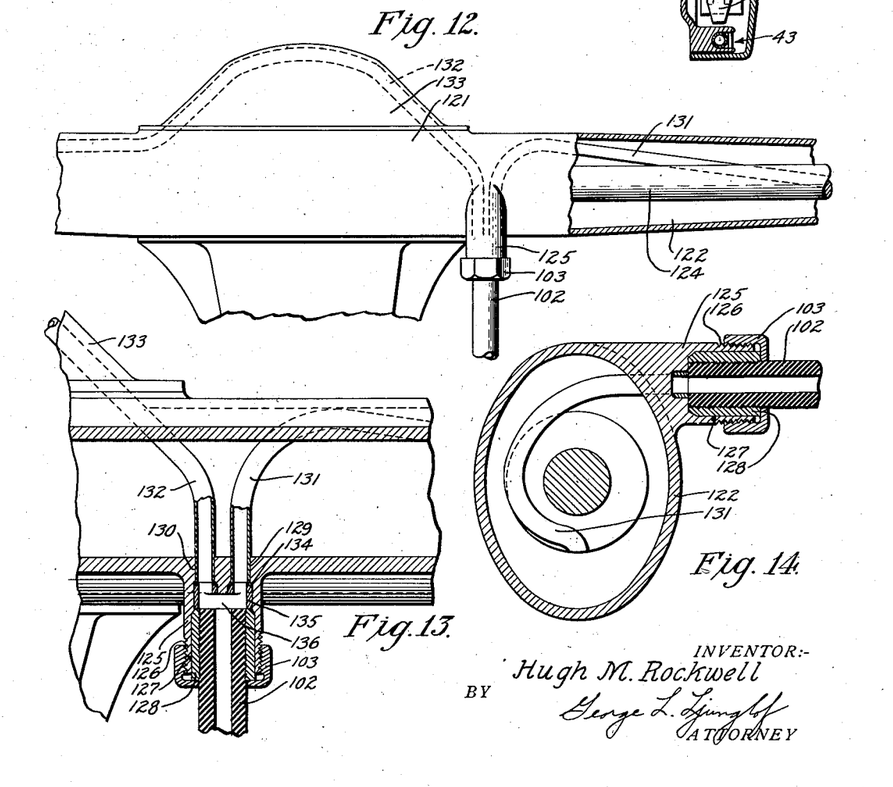
Fig. 12 is a top plan view thereof with parts broken away and parts in section.
Fig. 13 is a horizontal, transverse, sectional view on line 13—13 of Fig. 11, and drawn on a larger scale.
Fig. 14 is a vertical, transverse, sectional view on line 14—14 of Fig. 11 on a larger scale.
Figure 15:
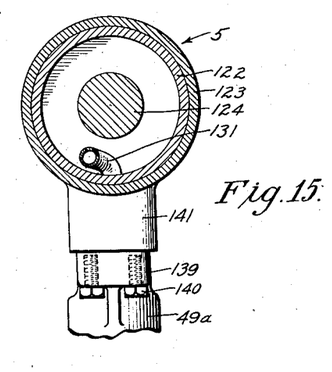
Fig. 15 is a similar sectional view on line 15—15 of Fig. 11.

In Figs. 11 to 14, inclusive, the salient features of the invention with reference to the rear axle 5 and rear wheel brakes 17 have been illustrated. Said rear axle 5 is preferably hollow and comprises the usual differential housing 121 carrying the laterally extending tubes 122, which are provided at their outer ends with the usual spring seats 123. As its name implies, the differential housing 121 encloses the differential gearing which constitutes the driving mechanism from the propeller shaft 9 to the axle drive shaft 124, by means of which the rear wheels 7 are rotated. Said differential gearing has not been illustrated in the drawings and may be of any of the ordinary well-known types. At any suitable point in its length, and preferably adjacent the differential housing 121, the rear axle 5 is provided with a forwardly extending boss 125, the outer end of which is screw-threaded, as at 126, for the reception of the coupling 103 of the oil conduit 102. Said boss 125 is provided with a counter-bore 127, within which is seated the ferrule 128 of the coupling 103, and extending inwardly from the bottom of said counter-bore to the interior of the tubular axle are a pair of smaller bores 129 and 130, both of which are in communication with the interior of the flexible oil conduit 102. Anchored in the bore 129 is one end of a relatively small tube 131 which is disposed more or less helically within the axle tube 122 and extends toward the right rear wheel. Similarly anchored in the bore 130 is a tube 132 which extends around the inner side of the differential housing plate 133 and bends laterally to the left rear wheel 7. The ends of said tubes 131 and 132 are slightly flared, as at 134, and held firmly in place by sleeves 135, the respective bores of which are preferably connected together by means of a transversely milled slot 136, (Fig. 13). The tubes 131 and 132 may be formed of copper or other desired material and have their outer ends deflected and extending through openings 137 adjacent the extremities of the axle tubes 122, and said deflected ends of the tubes are firmly anchored, as at 138, in the spring bottom portions of the seat members 123.

The rear brakes 17 are substantially the same as the front brakes 16, with the exception that instead of being mounted in or with the king pin 12, the wheel cylinders 49a are formed with angularly disposed attaching portions 139 which are secured by means of bolts 140 to the enlarged portions 141 in which the extremities of the tubes 122 are anchored at 138. Each of the rear wheel cylinders 49a is provided with a piston 48 of the same character as that already described in connection with the front wheel brakes, and fluid is supplied to the cylinder to actuate said piston through a bore 142 which connects the cylinder with the adjacent tube end 138. In this manner the lateral branches of the oil conduits are contained and concealed within the tubular axle and thoroughly protected from injury, and adjacent the rear wheels are no exposed flexible tubes customary in the prior art devices and hence nothing to interfere with jacking up the axle when necessary. The operative connection between the rear wheel cylinders 49a and the brake bands are identical with such connections in the front wheel brakes and the rear brake drums 20a are secured to the rear wheels in the same manner as the front wheel drums 20 are mounted.

Initially, the entire braking system, including the master cylinder 18, the longitudinal conduits 66 and 102 and the lateral conduits 61, 131 and 132 are filled with the braking fluid, which, as already explained, is oil. In some instances it might be desirable to have two different fluids in the system, particularly when the vehicle to which it is applied is driven in severely cold weather. Under such use the engine oil will circulate through the master cylinder from and to the engine crankcase, and by virtue of its circulation will be kept sufficiently warm by the heat of the engine to prevent congealing, whereas the fluid in the conduits adjacent the wheel cylinders might congeal sufficiently to cause the brake to be stiff and sluggish in action. To remedy such a condition, the lower part of the braking system may be supplied with a fluid which will not congeal except at a temperature lower than normal and which will not mix with the oil, while the upper part of the system is supplied with the cylinder oil in the manner already described. One fluid which may be used in the lower part of the system in this way is glycerine, and for still colder temperatures, a mixture of glycerine and alcohol in approximately equal parts will remain in proper condition to transmit braking pressure.

In connection with Figs. 3 and 5, certain features of the invention have been shown in a forged front axle having an I-beam cross-section, but it is to be understood that these features can also be incorporated in a tubular front axle, such as is used by some automobile manufacturers. Such a tubular axle has been illustrated in Fig. 10, in which the king pin 12 extends through the yoke end 145, which is secured as by welding or otherwise to the end of the axle tube 146. The lower arm 147 of the yoke end 145 is provided with an inclined hole 148, which, at its inner end communicates with a similar hole in the wall of the axle tube 146. A lateral branch conduit 149 extends through the axle tube 146 and has its lower end anchored in the hole 148, said anchorage being preferably effected by flaring the end of the tube 149 and clamping it between a pair of clamping blocks 150 and 151. The sleeve 151 communicates with the port 60 in the kingpin and with the interior of the tube 149, and there are, of course, two such tubes 149, one extending to each of the side wheels at the front axle and connected in any suitable manner to the longitudinal conduits 66.

As has previously been stated, the abutment member 43 and the supporting members 44 are preferably provided with automatic adjusting means whereby to compensate for wear of the brake band, and such automatic means is shown in Figs. 21 and 22 of the drawings. The abutment 43 comprises a bifurcated base 155 which is preferably integral with the mounting plate 40, and rotatably supported in said base 155 is a spool 156 which is held against longitudinal movement by virtue of end flanges 157 engaging against the ends of the base 155. A longitudinal bore 160 extends through the spool 156 and has one of its ends provided with a right-hand thread 158 and the other end provided with a left-hand thread 159, said threads extending inwardly from the opposite ends of the spool. In the illustrated embodiment, these threads have been shown as of the buttress type, but obviously, they may be of any other standard form desired. Screw-threaded studs 160 and 161 are respectively mounted in the threaded sockets 158 and 159, and extend outwardly from the opposite ends of the spool 156, said studs being held against rotation by guide fingers 162 engaging in grooves 163 in the inner surface of the plate 40. The threaded portions of the studs 160 and 161 have a comparatively loose fit with the respective threads 158 and 159, and a torsion spring 164 forms a connection between the studs 160 and 161 and the spool 156 in such a manner as to impart a relative rotary motion between these parts. Said spring 164 is anchored intermediate its ends, as by a pin 165 and has its opposite ends connected, as at 166, to the respective studs 160 and 161. Each of the studs 160 and 161 is further provided with a yieldable plunger 167 normally under the influence of a compression spring 168, said plunger being adapted to extend slightly beyond the extremity of the corresponding stud an amount equal to the clearance to be provided for the expansion and contraction of the brake band. Under normal conditions, the engagement of the ends 28 and 29 of the brake band against either the plungers 167 or the extremities of the studs 160 and 161 will impose sufficient friction on the threaded connections between the studs and the spool 156 to prevent rotation of said spool. When the brake band lining 23 becomes worn sufficiently to permit expansion of the band to the point where the ends 28 and 29 actually move away from the extremities of the plungers 167, the above-mentioned friction will be eliminated, and thereupon the torsion spring 164 is free to rotate the spool 156. Such rotation tends to increase the distance between the ends of the respective spool studs until the slack is taken up and this action will continue automatically throughout the entire life of the brake band lining.

The construction and operation of the automatically adjustable supporting members 44 are somewhat similar to the construction just described in connection with the abutment 43. Each of said supporting members includes a fixed boss 170, preferably integral with the mounting plate 40 and extending inwardly to the interior of the drum 20, and said boss 170 is provided with a radially extending bore having a screw thread, which, in the drawings, has been shown as of the buttress type. A plug 172 is anchored at the inner end of said threaded bore 171 and a rotatable stud 173 disposed in the outer end of said threaded bore and adapted upon rotation to move radially with reference to the brake drum. The plug 172 and stud 173 are respectively provided with counterbores 174 and 175 for the accommodation of a torsion spring 176, the lower end of which is anchored to the plug 172, and the upper end of said spring being connected to the stud 173 in such manner as to exert a rotary force tending to move the stud outwardly away from the axis of the brake drum. At its outer end the stud 173 has a reduced concentric extension 177 which is bored and counterbored for the reception of a plunger 178 and compression spring 179 similar to the plunger 167 and spring 168, described in connection with Fig. 21. The possible movement of the plunger 178 beyond the end of the stud extension 177 is equal to the predetermined clearance between the brake band lining and the interior of the brake drum flange 44, and while the stud 173 is normally prevented from rotation by virtue of frictional engagement of its threads with those of the bore 171, such frictional engagement is relieved when the brake band lining wears beyond the predetermined limit, and thereafter the spring 176 will slightly rotate the stud 173 to compensate for such wear. It is, of course, to be understood that the automatically adjustable supporting members 44 may be used with an anchored brake band of any ordinary or preferred type, in which case the abutment 43 is not required, and furthermore, the adjustable abutment 43 may be used without the adjustable supporting members 44. While the automatic adjusting means to compensate for wear of the brake band lining has been illustrated and described herein, they are not claimed in this application, but are made the subject-matter of a separate application for United States Letters Patent bearing the Serial Number 218,657, filed September 10, 1927.

It is thought that the operation of the invention will be thoroughly clear from the foregoing description, but brief recapitulation will be resorted to. Under normal conditions, when the brake is off the brake bands 22 will be contracted and entirely out of engagement with their respective brake drum flanges 24 and supported in substantially central position by means of the supporting members 44. In such condition, the pistons 48 will be at rest at their upper limits of movement in their respective cylinders 49 and 49a at the front and rear wheels, and the plunger 75 in the master cylinder 18 will be disposed at substantially its upper limit of movement. When it is desired to apply the brake, the operator steps upon the pedal 82, forcing the plunger 75 downwardly until its lower end enters the reamed portion 74 of the cylinder body 69. As the plunger thus moves down, it closes the oil return port 93 and compresses the fluid disposed below it in the reamed portion 74 and in the chamber 78. The pressure thus imposed upon the fluid in the system is transmitted equally in all directions, causing the pin valve 90a to move upwardly and close the oil supply from the engine and said fluid pressure is further transmitted through the conduits 66 and 102, and their respective branches 61, 131 and 132 to the several wheel cylinders. This results in downward or outward movement of the pistons 48, moving with them the brake-actuating levers 32 and 33. Assuming that the wheels are rotating at the time the foot pedal is depressed, expansion of the brake band 22 will continue until its lining 23 comes into frictional engagement with the inner periphery of the brake drum flange 24, whereupon said brake band will tend to rotate with the brake drum. Such rotation, however, will be arrested by engagement of one end or the other of the brake band with the abutment 43, and accordingly, the two levers 32 and 33 will shift slightly in a lateral direction with reference to their pistons 48 so that the entire braking force will be applied through said levers to the other end of the brake band. The result is that the accumulated torque in each of the brakes is made use of in stopping rotation of the brake drums without having any adverse influence on the braking force applied by the actuating levers. With this arrangement the wear on the brake band lining will be uniform throughout its entire area and such uniform wear also contributes to the increased life of the brake bands. As the operator subsequently releases the foot pedal, the fluid in the entire system tends to expand, with the result that the braking forces on the brake band are relieved and the several pistons return to their normal positions of rest, as previously described, and illustrated in the drawings. With the pistons properly fitted, the leakage of oil past them will be practically nil, by virtue of the connection of the master cylinder to the engine lubricating system, and it will be evident that even though there is a slight amount of leakage, the braking system will be entirely filled at all times with braking fluid, and therefore, there will be no lost motion of the pedal due to a reduction in the quantity of the fluid. Furthermore, as has previously been pointed out, the oil return tube 97 is disposed at substantially the highest point in the entire system and the result is that any air getting into the system will quickly work its way upwardly and be carried off through said tube 97, thus eliminating lost motion from pocketed air. Another feature is that there are no piston rings or packing requiring frequent replacement, and all of the parts are so simple in construction as to be practically incapable of getting out of adjustment. The self-venting feature is really made possible by the disposition of the wheel cylinders at points substantially spaced below the wheel axes, while the master cylinder is disposed in a position above said axes, this relative arrangement making possible the gradual inclination of the oil conduits throughout their entire length. The extreme simplicity of the parts renders the entire braking system capable of manufacture at low cost, as compared with the prior art braking systems, and capable of application in vehicles wherein space for mounting the various parts is to a certain extent limited.

The several features of this invention may be used either with or without other features, and the invention is susceptible of numerous modifications in the details of construction and arrangement of parts. Therefore, the right is herein reserved to make changes as fall within the scope of the appended claims, wtihout departing from the spirit of the invention.

The present application is a re-filing of my application Serial Number 218,656, filed September 10, 1927.

Having thus described my invention, what I claim is:

1. In a vehicle having road wheels and brakes associated therewith and an engine for propelling the vehicle provided with an oiling system, a fluid pressure braking system including brake-actuating cylinders, means including pistons for transmitting power from said cylinders to their respective brakes, a fluid pressure creating unit, fluid conducting means between said unit and the brake actuating cylinders, means for supplying oil to the pressure creating unit from the engine oiling system of the vehicle and maintaining a circulation therein, and means for discontinuing the supply upon service application of the brakes.

2. In a motor vehicle, in combination, an axle, a steering knuckle, a bolt forming a pivotal connection between said steering knuckle and axle, a wheel rotatably mounted on said steering knuckle, a brake drum carried by said wheel, a brake band associated with said brake drum, a pressure cylinder carried by the lower end of said pivot bolt and coaxial therewith, a piston operably disposed in said pressure cylinder, and rocking elements interposed between the piston and the ends of the brake band, said rocking elements having free sliding engagement with the brake band and the piston.

3. In a motor vehicle, in combination, an axle, a steering knuckle, a bolt forming a pivotal connection between said steering knuckle and axle, a wheel rotatably mounted on said steering knuckle, a brake drum carried by said wheel, a brake band associated with said brake drum, a pressure cylinder integral with the lower end of said pivot bolt and coaxial therewith, a piston operably disposed within said pressure cylinder, rocking elements interposed between the piston and the ends of the brake band, said rocking elements having free sliding engagement with the brake band and the piston, and means for conducting pressure fluid to the pressure cylinder downwardly through the axle.

4. In a braking system for vehicles, brake members including self-energizing brake bands, a fluid pressure system, means for creating pressure in the system, and means responsive to the pressure therein to operate the brake members, each of said operating means including a pressure cylinder mounted in a fixed position, a piston slidable in said cylinder, a pair of levers interposed between the piston and opposing ends of the brake band, said levers having free sliding contact with the piston and the brake band, and floating pivotal means for said levers located intermediate the ends of the levers and offset therefrom.

5. In a braking system for vehicles, brake members including self-energizing brake bands, a fluid pressure system, means for creating pressure in the system, and means responsive to the pressure therein to operate the brake members, each of said operating means including a pressure cylinder mounted in fixed position, a piston slidable in said cylinder, a pair of levers interposed directly between the piston and opposing ends of the brake band and having sliding contact only with the piston and the brake band, and floating pivotal supports for the levers interposed between the ends of the levers, said levers having portions in rolling contact with each other and concentric with the pivots.

6. In a vehicle having a prime mover provided with a pressure lubricating system, a hydraulic braking system including a master cylinder, oil supply line connections between the master cylinder and the pressure lubricating system for maintaining a full supply of liquid in the master cylinder, and a check valve to prevent transmission of braking pressure from the master cylinder to the lubricating system when the brakes are applied.

7. In a vehicle having a prime mover provided with a pressure lubricating system, a hydraulic braking system, and fluid conducting means for utilizing the pressure of the lubricating system to automatically circulate oil heated by the prime mover for pressure transmission purposes from said pressure lubricating system to and through parts of said braking system when the brakes are in released position.

8. In a vehicle having a prime mover provided with a pressure lubricating system, a hydraulic braking system, fluid-conducting means for utilizing the pressure of the lubricating system to automatically circulate oil heated by the prime mover for pressure transmission purposes from said pressure lubricating system to and through parts of said braking system, and means to prevent return of the oil to the lubricating system when braking pressure is set up in the braking system.

9. In a vehicle having road wheels and brakes associated therewith, a fluid pressure braking system including brake-actuating cylinders, means for transmitting power from said cylinders to their respective brakes, a master cylinder, fluid-conducting means between the master cylinder and the brake-actuating cylinders, means for supplying oil to the master cylinder from the engine oiling system of the vehicle, and a heavier, non-freezing fluid in the brake-actuating cylinders and conducting means below the master cylinder, said heavier fluid being insoluble in the oil.

10. A fluid pressure braking system comprising foot-operated fluid pressure generating means, fluid pressure transmitting means, a non-freezing liquid in said transmission means, and a lighter insoluble liquid in the pressure generating means.

11. In a vehicle having a prime mover, a hydraulic braking system including a master cylinder for generating fluid pressure, and means for heating the fluid in said master cylinder including ducts communicating with the prime mover for permitting circulation of oil from the prime mover to the master cylinder.

12. In a vehicle having road wheels and brakes associated therewith and an engine for propelling the vehicle provided with an oiling system, a fluid pressure braking system including brake-actuating cylinders, means for transmitting power from said cylinders to their respective brakes, a unit for creating fluid pressure, fluid-conducting means between the unit and the brake-actuating cylinders, means for supplying oil to the unit from the engine oiling system of the vehicle, and means for discontinuing said oil supply upon creation of pressure by said unit.

13. A hydraulic brake comprising, in combination, a brake drum, a one-piece expansible resilient brake band fitted with a friction lining adapted to engage the drum throughout major portion of its circumferential extent, the brake band having limited floating movement with reference to the drum whereby to be self-energizing, an open-end pressure cylinder fixed with reference to the drum and adjacent to the ends of the brake band, a piston slidable in the cylinder, a pair of levers having sliding contact with the piston and the ends of the brake band, said levers having mutually-engaging portions in rolling contact with each other, and a pair of pivoted links giving floating support to said levers.

14. In a vehicle having a prime mover provided with a pressure lubricating system, a hydraulic braking system, and fluid-conducting means connecting the upper portion of said braking system with said lubricating system whereby to supply it with oil in constant amount, the lower portion of the braking system containing a heavier non-freezing fluid which is insoluble in the oil.

15. In a vehicle having a prime mover provided with a pressure lubricating system, a hydraulic braking system, a pressure creating unit in the hydraulic braking system, means for circulating the oil of the pressure lubricating system through the pressure creating unit, and means for interrupting the circulation of the oil through the pressure creating unit by operation of said pressure creating unit.

16. In a vehicle having a prime mover provided with a pressure lubricating system, a hydraulic braking system including brake actuating cylinders and a master cylinder, the master cylinder being located at a higher level than the brake actuating cylinders, with inclined fluid conducting means from the master cylinder to the brake actuating cylinders, means for circulating oil of the pressure lubricating system through the master cylinder for maintaining a constant level of oil in the master cylinder and permitting escape from the master cylinder of any air arising in the braking system, and means for interrupting circulation of oil from the pressure lubricating system through the master cylinder upon creation of pressure in the master cylinder for application of the brakes.

HUGH M. ROCKWELL.